United States Patent Office.

FRANK NORMAN SPEAR, OF LOS ANGELES, CALIFORNIA.

PROCESS OF TREATING LIME.

SPECIFICATION forming part of Letters Patent No. 683,188, dated September 24, 1901.

Application filed April 24, 1901. Serial No. 57,252. (No specimens.)

*To all whom it may concern:*

Be it known that I, FRANK NORMAN SPEAR, a citizen of the United States, residing at Los Angeles, in the county of Los Angeles and State of California, have invented an Improvement in Processes of Treating Lime, of which the following description is a specification.

Common quicklime or calcium oxid as used in the arts for building and other purposes is well known to be dangerous and objectionable because of its tendency to slake, swell, heat, and shrink, usually resulting either directly or indirectly from its absorption of moisture from the air, water, or other source. Furthermore, when used in the form of lime, mortar, and plaster the great length of time ordinarily required for the mass to absorb carbonic-acid gas sufficient to become hard or form a carbonate has proved very objectionable. Various attempts to eliminate these objections have been made, attended with more or less success. For example, ordinary quicklime has been slaked to a putty, screened, run into pans or kettles or made into bricks, baked or dried, and then ground or pulverized for use, the lime so treated being left in such condition that it will not then swell, heat, or otherwise change its condition sufficiently to be objectionable; but it will harden no better than ordinary slaked lime. In connection with the above process, wherein the quicklime is first slaked to a putty, it has been attempted to dry the putty by passing it through a revolving tumbler or drier, beneath which is maintained a fire from coke or other substance, the combustion of which evolves carbonic-acid gas, which is conducted through the tumbler-drier and is absorbed more or less by the lime being dried within, the resultant lime product when ground or pulverized being thus so thoroughly charged with carbonic-acid gas that when subsequently used in the form of mortar or plaster its contained carbonic-acid gas is already sufficient to cause the mortar or plaster to harden quickly without waiting for the much slower process of absorption of such gas from the air. The practice of these processes is slow and expensive and at best is attended with varying success.

The object of my invention is to provide an improved process for treating lime to render it capable of being kept for any desired time without detriment or danger and a lime also that when used in the form of mortar or plaster will harden quickly and properly.

In the practice of my improved process the lime as it comes from the kiln in the form of "quicklime," so-called, is slaked, and then and while in a finely divided, powdered, or pulverized condition is brought into contact with a carbonic-acid gas which is taken up by the finely-divided slaked lime in such quantity as to leave the resultant lime in a condition in which it will quickly harden when mixed or used in the form of mortar or plaster. The slaking and charging with gas may be accomplished in any suitable or desired manner. For instance, the quicklime obtained from the kiln may and preferably is ground or pulverized or otherwise reduced to a finely-divided condition and is then discharged into or caused to pass through, as by sifting or blowing, a closed chamber in the presence of a vapor, such as steam, which may be discharged or delivered into said chamber in any desired manner and which, by contact with the finely-divided lime, hydrates or slakes the same. Care must be taken to avoid an excess of moisture, although this can be easily regulated to cause the fine particles of lime to take up only so much moisture as is required for the slaking. After being slaked in this manner the finely-divided lime is next brought into contact with the carbonic-acid gas, and this may conveniently be done by passing the finely-divided slaked lime into a second chamber containing the carbonic-acid gas, which is taken up by the lime in passing therethrough substantially as the moisture was taken up in passing through the first chamber, or, if desired, the gas may be admitted into the same chamber as the steam and to act upon the lime while in transit immediately after its contact with the steam, or the steam and gas may commingle in this one chamber and act simultaneously upon the finely-divided lime. After having been slaked and charged with the gas, as above described, the lime still retains its finely-divided condition in the best possible form for commercial use, and because it is slaked and charged in a finely-divided condition the uniformity of action and of product is greatly increased over what is possible by any of the known processes for treating lime in attempts to obtain similar results, and because the process above described is substantially continuous and may be carried on without handling it is extremely quick and inexpensive. Thus my improved process not only produces a superior article, but this is obtained at the same time more expeditiously and more economically than has heretofore been possible. I find also that mortar or plaster made by the use of lime slaked or treated as above described may be manipulated with a trowel or similar implement much more expeditiously than lime treated by many other processes because of utter lack of the objectionable property of sticking or adhering to the trowels or similar implements. The carbonic-acid gas may be generated in suitable manner and obtained from a suitable source. It may be generated as required or taken from a tank under pressure, or, with proper connections, it may be taken directly from the kiln in which the lime is first calcined and that is thrown off during the calcined process, so that, if properly arranged, the generation of the gas need involve no additional expense whatsoever.

Having described my invention and without limiting myself to details or immaterial steps or devices, what I claim, and desire to secure by Letters Patent, is—

1. The process for treating lime which consists in first slaking quicklime, and then and when in a finely-divided condition, bringing the slaked lime into contact with carbonic-acid gas.

2. The process for treating lime which consists in first finely dividing the quicklime, slaking it by contact with a moist vapor, such as steam, and then and while in a finely-divided condition, bringing the slaked lime into contact with carbonic-acid gas.

3. The process for treating lime which consists in finely dividing the quicklime, and then bringing the same into contact with a moist vapor, such as steam and carbonic-acid gas.

4. The process for treating lime which consists in first finely dividing the quicklime, and then subjecting the same to the action of steam in a closed chamber, and to the action of carbonic-acid gas also in a closed chamber.

5. The process for treating lime which consists in finely dividing the quicklime, slaking it by contact with steam, and then bringing it into contact with carbonic-acid gas obtained from a calcining-kiln.

6. As an article of manufacture lime which as quicklime has been slaked and while in a finely-divided condition subjected to the action of carbonic-acid gas.

7. An article of manufacture lime which as a quicklime has been reduced to a finely powdered or pulverized condition and slaked by contact with steam and then and while still in a finely-divided condition brought into contact with a carbonic-acid gas.

8. As an article of manufacture finely-divided lime that as a quicklime was subjected while in a finely-divided condition to the action of steam and carbonic-acid gas.

In testimony whereof I have signed my name to this specification in the presence of two subscribing witnesses.

FRANK NORMAN SPEAR.

Witnesses:
FREDERICK L. EMERY,
ANNIE E. CHESLEY.